(12) United States Patent
Cai

(10) Patent No.: US 12,671,627 B2
(45) Date of Patent: Jun. 30, 2026

(54) COMPUTING POWER NETWORK NODE EVALUATION AND OPERATION METHOD AND APPARATUS

(71) Applicant: YANGTZE DELTA INDUSTRIAL INNOVATION CENTER OF QUANTUM SCIENCE AND TECHNOLOGY, Suzhou (CN)

(72) Inventor: Jian Cai, Suzhou (CN)

(73) Assignee: YANGTZE DELTA INDUSTRIAL INNOVATION CENTER OF QUANTUM SCIENCE AND TECHNOLOGY TECHNOLOGY, Suzhou (CN)

( * ) Notice: Subject to any disclaimer, the term of this patent is extended or adjusted under 35 U.S.C. 154(b) by 84 days.

(21) Appl. No.: 18/796,356

(22) Filed: Aug. 7, 2024

(65) Prior Publication Data

US 2024/0396799 A1 Nov. 28, 2024

Related U.S. Application Data

(63) Continuation of application No. PCT/CN2022/119801, filed on Sep. 20, 2022.

(30) Foreign Application Priority Data

May 11, 2022 (CN) .......................... 202210515169.5

(51) Int. Cl.
*H04L 41/0823* (2022.01)
*H04L 43/08* (2022.01)
(52) U.S. Cl.
CPC .......... *H04L 41/0823* (2013.01); *H04L 43/08* (2013.01)

(58) Field of Classification Search
CPC ........................... H04L 41/0823; H04L 43/08
(Continued)

(56) References Cited

U.S. PATENT DOCUMENTS 9,466,036 B1 * 10/2016 Vicaire ................... H04L 67/10
2023/0412672 A1 * 12/2023 Xu ......................... H04L 47/765

FOREIGN PATENT DOCUMENTS

CN 113079218 A * 7/2021 ......... H04L 41/0893
CN 113590282 A * 11/2021 ........... G06F 9/5027
(Continued)

*Primary Examiner* — Zi Ye
(74) *Attorney, Agent, or Firm* — Jose Cherson Weissbrot

(57) ABSTRACT

A computing power network node evaluation and operation method includes: determining overall computing power information of a computing power network; evaluating a computing power service for a computing power service demand based on the overall computing power information and the computing power service demand so as to obtain a computing power evaluation value of each computing power node; determining a computing power configuration scheme corresponding to the computing power service demand based on the computing power evaluation value of each computing power node and a computing power calling mode of each computing power node within a time period corresponding to the computing power service demand; and respectively sending computing power operation instructions to a computing power demand node and a computer power service node indicated in the computing power configuration scheme to establish a computing power calling connection, thus completing the computing power service demand.

6 Claims, 4 Drawing Sheets

(58) Field of Classification Search
USPC ........................................................ 709/223
See application file for complete search history.

(56) References Cited

FOREIGN PATENT DOCUMENTS

| | | | |
|---|---|---|---|
| CN | 113840317 | A | 12/2021 |
| WO | 2020263374 | A1 | 12/2020 |

* cited by examiner

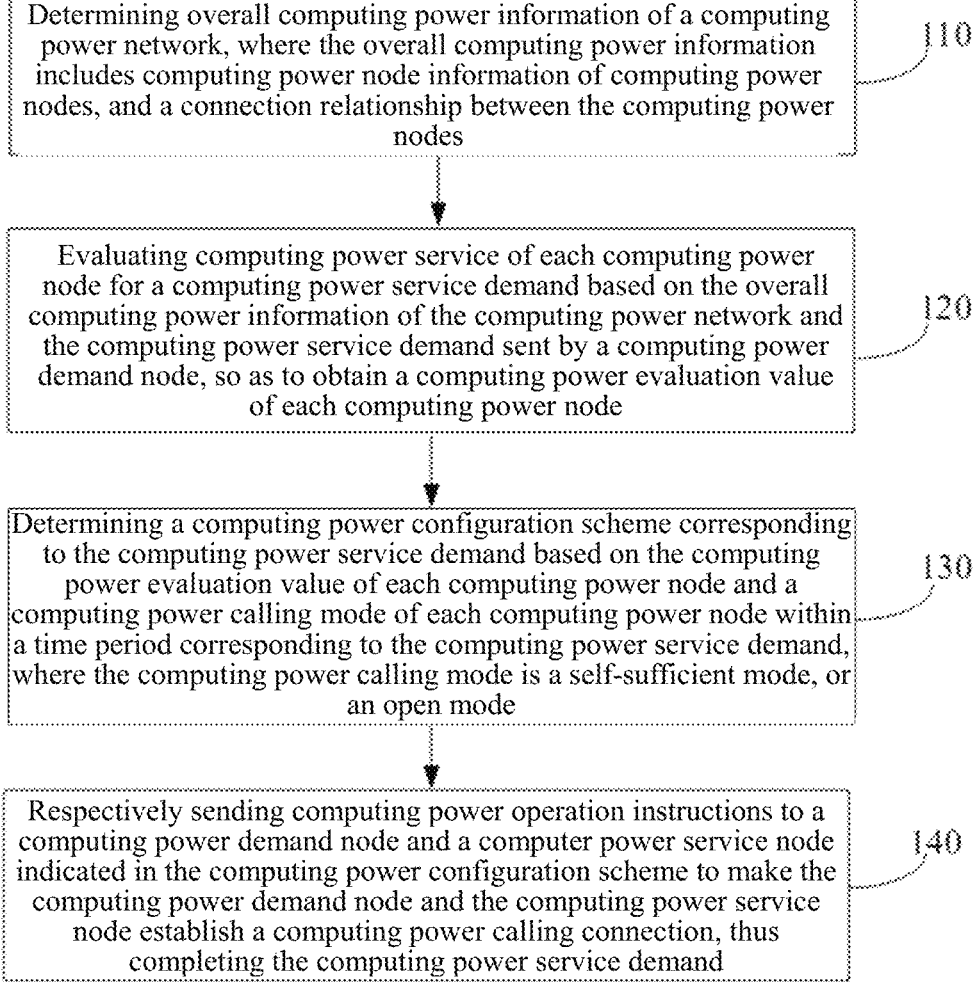

Determining overall computing power information of a computing power network, where the overall computing power information includes computing power node information of computing power nodes, and a connection relationship between the computing power nodes                    )10

Evaluating computing power service of each computing power node for a computing power service demand based on the overall computing power information of the computing power network and the computing power service demand sent by a computing power demand node, so as to obtain a computing power evaluation value of each computing power node                    )20

Determining a computing power configuration scheme corresponding to the computing power service demand based on the computing power evaluation value of each computing power node and a computing power calling mode of each computing power node within a time period corresponding to the computing power service demand, where the computing power calling mode is a self-sufficient mode, or an open mode                    )30

Respectively sending computing power operation instructions to a computing power demand node and a computer power service node indicated in the computing power configuration scheme to make the computing power demand node and the computing power service node establish a computing power calling connection, thus completing the computing power service demand                    )40

FIG. 1

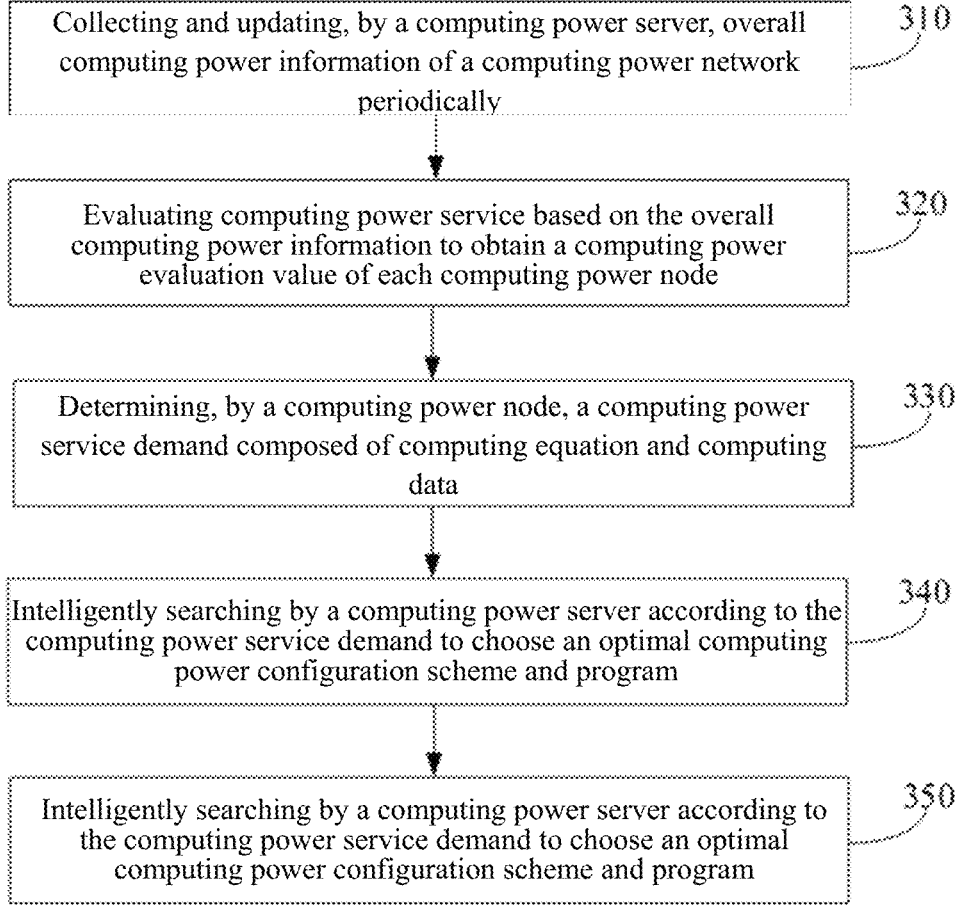

Collecting and updating, by a computing power server, overall computing power information of a computing power network periodically                310

Evaluating computing power service based on the overall computing power information to obtain a computing power evaluation value of each computing power node                320

Determining, by a computing power node, a computing power service demand composed of computing equation and computing data                330

Intelligently searching by a computing power server according to the computing power service demand to choose an optimal computing power configuration scheme and program                340

Intelligently searching by a computing power server according to the computing power service demand to choose an optimal computing power configuration scheme and program                350

FIG. 3

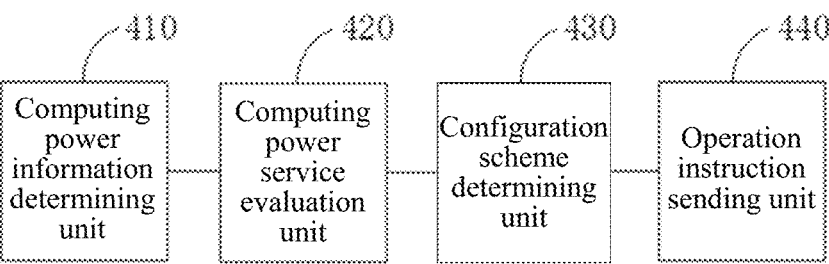

| 410 | 420 | 430 | 440 |
|---|---|---|---|
| Computing power information determining unit | Computing power service evaluation unit | Configuration scheme determining unit | Operation instruction sending unit |

FIG. 4

COMPUTING POWER NETWORK NODE EVALUATION AND OPERATION METHOD AND APPARATUS

CROSS-REFERENCE TO RELATED APPLICATIONS

The present application is a continuation of International Application No. PCT/CN2022/119801, with an international filing date of Sep. 20, 2022, which is based upon and claims priority to Chinese Patent Application No. 202210515169.5, filed on May 11, 2022, the entire contents of all of which are incorporated herein by reference.

TECHNICAL FIELD

The present disclosure relates to the technical field of electronic computing and quantum computing, and in particular to a computing power network node evaluation and operation method and apparatus.

BACKGROUND

The development of digital economy has brought a rapid growth in computing power demand. The increase of computing power efficiency and the reduction of computing power cost are key technical problems in the fields of computer and Internet.

Computing power network technology has become a key technology to significantly enhance the information technology value of the Internet and cloud computing. The existing means for improving the computing power resources by cloud computing technology mainly come from two technical directions: one is to improve the computing speed and performance of the server, and the other is to optimize network data transmission speed and performance.

However, the way of optimizing internal or local network systems of electronic computers is mainly adopted in these two technical directions, but due to the limitation of own computing resources and network transmission structure systems inside the electronic computers, it is difficult to solve the problem of computing power optimization in large-scale networks.

SUMMARY

A computing power network node evaluation and operation method and apparatus are provided by the present disclosure, which are used to solve the defect that the cloud computing technology in the prior art is difficult to solve the computing power optimization problem in a large-scale network.

A computing power network node evaluation and operation method is provided, which is applied to a computing power server in a computing power network. The computing power network includes at least one computing power node, and the method includes the following steps:

determining overall computing power information of the computing power network, where the overall computing power information includes computing power node information of computing power nodes, and a connection relationship between the computing power nodes;

evaluating computing power service of each computing power node for a computing power service demand based on the overall computing power information of the computing power network and the computing power service demand sent by a computing power demand node to obtain a computing power evaluation value of each computing power node;

determining a computing power configuration scheme corresponding to the computing power service demand based on the computing power evaluation value of each computing power node and a computing power calling mode of each computing power node within a time period corresponding to the computing power service demand, where the computing power calling mode is a self-sufficient mode or an open mode; and respectively sending computing power operation instructions to a computing power demand node and a computer power service node indicated in the computing power configuration scheme to make the computing power demand node and the computing power service node establish a computing power calling connection, thus completing the computing power service demand.

According to the computing power network node evaluation and operation method, the evaluating computing power service of each computing power node for a computing power service demand based on the overall computing power information of the computing power network and a computing power service demand sent by a computing power demand node to obtain a computing power evaluation value of each computing power node includes the following steps:

determining first candidate computing power nodes satisfying the computing power service demand based on the overall computing power information and the computing power service demand sent by the computing power demand node;

generating a computing power network matrix for the computing power service demand based on a historic computing power service volume between the computing power demand node and each first candidate computing power node as well as a connection relationship between the computing power demand node and each first candidate computing power node, where the historic computing power service volume is determined based on the overall computing power information; and solving the computing power network matrix to obtain a computing power evaluation value of each first candidate computing power node.

According to the computing power network node evaluation and operation method, the determining first candidate computing power nodes satisfying the computing power service demand based on the overall computing power information of the computing power network and a computing power service demand sent by a computing power demand node includes the following steps:

determining a computing power service feature parameter demand and algorithm information corresponding to the computing power service demand; and determining first candidate computing power nodes conforming to the computing power service feature parameter demand and algorithm information from a computing power service quantitative feature library, where the computing power service quantitative feature library is determined based on the overall computing power information.

According to the computing power network node evaluation and operation method, the computing power service quantitative feature library is determined based on the following steps:

generating computing power service feature parameters based on the overall computing power information;

extracting a quantitative feature served by each comput-
ing power service node from the computing power
service feature parameters, so as to obtain each com-
puting power service quantitative feature; and determining the computing power service quantitative
feature library according to each computing power
service quantitative feature.

According to the computing power network node evalu-
ation and operation method, the determining a computing
power configuration scheme corresponding to the comput-
ing power service demand based on the computing power
evaluation value of each computing power node and a
computing power calling mode of each computing power
node within a time period corresponding to the computing
power service demand includes the following steps:

determining a second candidate computing power node
from the first candidate computing power nodes, where
the second candidate computing power node is a com-
puting power node in which the computing calling
mode within the time period corresponding to the
computing power service demand is an open mode; and determining an optimal computing power path from the
second candidate computing power node with at least
one of the highest sum of computing power evaluation
values of the computing power nodes in a computing
power path, the lowest sum of computing power prices
of the computing power nodes in the computing power
path, and the highest ratio of the sum of the computing
power evaluation values to the sum of the computing
power prices of the computing power nodes in the
computing power path as a target; and determining a
computing power configuration scheme corresponding
to the computing power service demand based on the
optimal computing power path.

The computing power price is determined based on the
computing power node information.

According to the computing power network node evalu-
ation and operation method, after the respectively sending
computing power operation instructions to a computing
power demand node and a computer power service node
indicated in the computing power configuration scheme to
make the computing power demand node and the computing
power service node establish a computing power calling
connection to complete the computing power service
demand, the method further includes the following steps:

supervising the computing power demand node to pay
computing power fee to the returned by the computing
power demand node; and updating the overall computing power information based
on the computing power state update information.

According to the computing power network node evalu-
ation and operation method, the computing power calling
mode of each computing power node is determined by
determining whether the computing power service is surplus
or not by any computing power node for any computing
power service demand of the node.

In a case that the computing power service is surplus, each
computing power node determines that the computing power
calling mode is an open mode; and in a case that the
computing power service is not surplus, the computing
power calling mode is the self-sufficient mode.

An computing power network node evaluation and opera-
tion apparatus is further provided by the present disclosure,
which is applied to a computing power server in a computing
power network. The computing power server includes at
least one computing power node, and the device includes:

a computing power information determining unit, config-
ured to determine overall computing power informa-
tion of a computing power network, where the overall
computing power information includes computing
power node information of computing power nodes,
and a connection relationship between the computing
power nodes;

a computing power service evaluation unit, configured to
evaluate computing power service of each computing
power node for a computing power service demand
based on the overall computing power information of
the computing power network and the computing
power service demand sent by a computing power
demand node to obtain a computing power evaluation
value of each computing power node;

a configuration scheme determining unit, configured to
determine a computing power configuration scheme
corresponding to the computing power service demand
based on the computing power evaluation value of each
computing power node and a computing power calling
mode of each computing power node within a time
period corresponding to the computing power service
demand, where the computing power calling mode is a
self-sufficient mode or an open mode; and an operation instruction sending unit, configured to
respectively send computing power operation instruc-
tions to a computing power demand node and a com-
puter power service node indicated in the computing
power configuration scheme to make the computing
power demand node and the computing power service
node establish a computing power calling connection,
thus completing the computing power service demand.

An electronic device or a quantum device is further
provided by the present disclosure, including a memory, a
processor, and an electronic computer program or a quantum
computer program stored on the memory and capable of
being operated on the processor. The processor, when
executing the program above, can implement any computing
power network node evaluation and operation method
above.

A non-transient computer-readable storage medium is
further provided. An electronic computer program and/or a
quantum computer program is stored on the non-transient
computer-readable storage medium, and the computer pro-
gram, when executed by a processor, is configured to
implement any computing power network node evaluation
and operation method above.

A computer program product is further provided, includ-
ing an electronic computer program and/or a quantum
computer program. The computer program, when executed
by a processor, is configured to implement any computing
power network node evaluation and operation method
above.

Compared with the prior art that the computing power
optimization of a large-scale computing power network is
difficult to achieve due to the fact that the structure and
protocol take network routing data transmission speed as the
target without considering the algorithm and computing
power level, the overall information of the computing power
network is adopted in the computing power network node
evaluation and operation method and apparatus to achieve
computing power evaluation of each computing power node
in a network structure, compute a configuration scheme of
computing power service of the computing power network,
and manage and supervise the transaction and completion of the computing power service, thus achieving dynamic, real-time and efficient computing power configuration and operation.

In addition, within the time period corresponding to the computing power service demand, computing power of the computing power nodes in the open mode are connected to the grid for service, and the computing power server gives full play to powerful computing power advantages of quantum computing to optimize the configuration and control of the computing power network system. The utilization rate of a processor, a memory, a network router and other computing power network resources of the Internet is significantly improved.

The computing power nodes are connected to the grid in an open mode, and thus more different types of computing power service on the computing power network can be called, with the practical effect that the processor type and capacity of each computing power node are expanded. Each computing power node can be expanded to form collaborative computing power, and the application program is independent of a hardware processor, and codes do not need to be modified and compiled again when the computing power is called by different computing power nodes, and thus the overall collaborative computing efficiency is greatly enhanced.

BRIEF DESCRIPTION OF THE DRAWINGS

To describe the technical solutions of the present disclosure or in the prior art more clearly, the following briefly introduces the accompanying drawings required for describing the embodiments or the prior art. Apparently, the accompanying drawings in the following description show merely some embodiments of the present disclosure, and those of ordinary skill in the art may still derive other drawings from these accompanying drawings without creative efforts.

FIG. 1 is a first flow chart of a computing power network node evaluation and operation method according to the present disclosure;

FIG. 3 is a second flow chart of a computing power network node evaluation and operation method according to the present disclosure;

FIG. 4 is a structural diagram of a computing power network node evaluation and operation apparatus according to the present disclosure;

DESCRIPTION OF THE EMBODIMENTS

Figure 2:
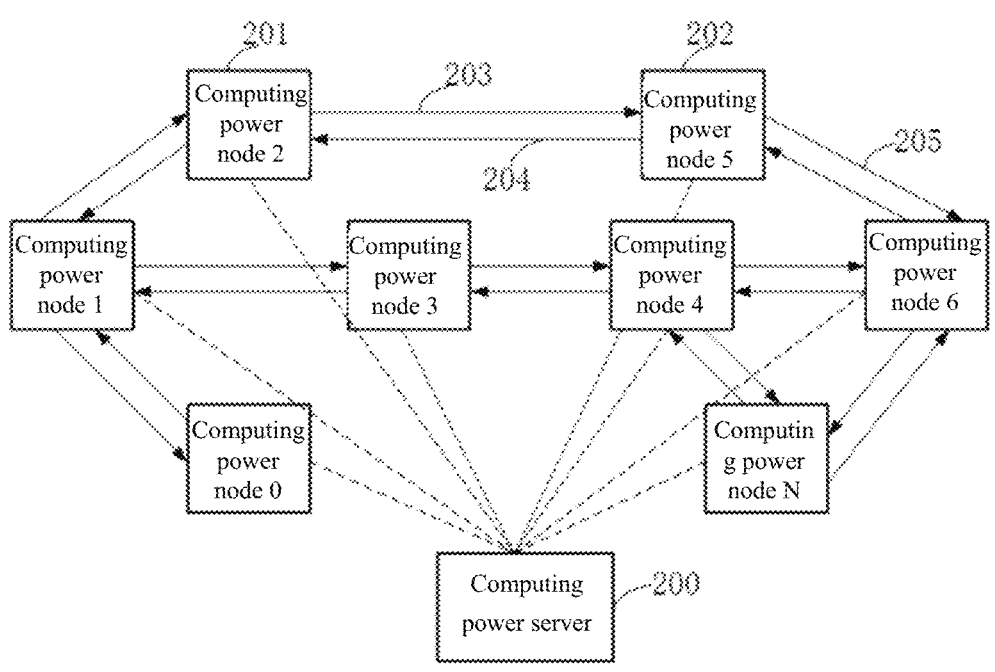
FIG. 2 is a schematic diagram of a computing power network according to the present disclosure.

To make the objectives, technical solutions and advantages of the present disclosure more clearly, the following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

In the direction of improving computing speed and performance of a server, FaaS (Function as a Service) technology provides a basic cloud computing service mode. However, the cold start time of the FaaS platform, i.e., the time required to start a new container to execute functions, may lead to several seconds of execution delay. Hardware heterogeneity makes the prediction of execution time of functions difficult, and a complex trigger mechanism may lead to obvious delay in the execution of functions on some platforms, thus limiting the utilization of computing power resources.

In the aspects of optimizing network data transmission speed and performance, the Software Defined Network (SDN) technology can optimize the transmission of network traffic, but cannot optimize and control the computing power performance of a computing power network in essence.

In addition, there are two existing schemes to passively reduce routing transmission path information: the first is to set a destination address as a network address instead of a host address in a routing table, and all the hosts in the same network are regarded as an entry, so as to save a storage space of the routing table and improve the efficiency of table lookup; and the second is that only next-hop routing to the destination, instead of all the paths, is reserved in the routing table, so as to simplify the routing table and make each router choose the path independently.

As computing resources in the network are in dynamic change at any time, for a large-scale network with hundreds of millions of computing power nodes, the table lookup and path computing speed of an electronic computer cannot keep up with the change speed of the computing power resources, and thus these two passive information reduction schemes cannot solve the problem of dynamic computing power configuration of a complex network.

Based on this, a computing power network node evaluation and operation method is provided by an embodiment of the present disclosure. The method is applied to a computing power network including at least one computing power node, and overall information of the computing power network is used to achieve computing power evaluation of each computing power node in a network structure, compute a configuration scheme of computing power service of the computing power network, and manage and supervise the transaction and completion of the computing power service, thus achieving dynamic, real-time and efficient computing power configuration and operation.

FIG. 1 is a flow chart of a computing power network node evaluation and operation method according to an embodiment of the present disclosure. As shown in FIG. 1, the method includes the following steps:

Step 110. Overall computing power information of the computing power network is determined, where the overall computing power information includes computing power node information of computing power nodes, and a connection relationship between the computing power nodes.

Specifically, the overall computing power information may reflect the computing power node information and network information of each computing power node in the computing power network. A computing power server can collect and update the overall computing power information of the computing power network periodically. The computing power server acquires the computing power node information of each computing power node through a computing power node network port in the computing power network, or collects the computing power node information through an application program interface (API) or a dedicated computing power monitoring port.

Here, each computing power node may include an electronic computer, a quantum computer, a server, a router, a mobile computing device, a sensor, and the like.

The computing power node information may specifically include an information input parameter, a data computing parameter, and an information output parameter of each computing power node.

The information input parameter includes information speed of calling the own memory by the computing power node, and the information transmission speed on the Internet. The data computing parameter includes a processor type, e.g., a CPU (Central processing unit), a GPU (graphic processing unit), a dedicated processor, an embedded processor and other hardware parameters, and processing speed of the processor for different algorithms and data combinations in various computing environments. The information output parameter includes computing data storage and network transmission mode of each computing power node, as well as data output speed in various network environments.

The connection relationship between the computing power nodes is network information, and the connection relationship here generally refers to a dynamic connection relationship. The connection relationship may specifically include a connection mode between any two computing power nodes, e.g., a network protocol, a connecting port, a routing mode, and the like. The connection relationship further includes a protocol and port for Internet connection provided by the computing power node at specific time.

Step 120. Computing power service of each computing power node for a computing power service demand is evaluated based on the overall computing power information of the computing power network and the computing power service demand sent by a computing power demand node to obtain a computing power evaluation value of each computing power node.

Specifically, the computing power service demand sent by the computing power demand node refers to a computing power service demand sent by any computing power demand node in the computing power network to a server. The computing power service demand includes computing power performance index information, algorithm information, computing data information, computing power service price cap information, computing power service completion time requirements, etc. of the computing power service.

The server, after receiving the computing power service demand, can query computing power nodes conforming to the computing power service demand according to the overall computing power information. According to a historical computing power service volume in the overall computing power information, the computing power service of each computing power node conforming to the computing power service demand is evaluated to obtain a computing power evaluation value of each computing power node.

The computing power evaluation value obtained therefrom can reflect the importance of each computing power node for the computing power service demand. The higher the computing power evaluation value, the higher the importance of the corresponding computing power node thereof to the computing power service demand, and the higher the called possibility when the server performs the computing power configuration. The lower the computing power evaluation value, the lower the importance of the corresponding computing power node thereof to the computing power service demand, and the lower the called possibility when the server performs computing power configuration.

Step 130. A computing power configuration scheme corresponding to the computing power service demand is determined based on the computing power evaluation value of each computing power node and a computing power calling mode of each computing power node within a time period corresponding to the computing power service demand. The computing power calling mode is a self-sufficient mode, or an open mode.

Specifically, on the basis of obtaining the computing power evaluation value of each computing power node, the computing power calling mode of each computing power node within the time period corresponding to the computing power service demand is combined to perform scheme configuration for the computing power service demand, thus obtaining a computing power configuration scheme corresponding to the computing power service demand.

In addition, the computing power calling mode is a self-sufficient mode, or an open mode. The self-sufficient mode represents that the computing power node calls a local processor and memory for computing processing. The open mode represents that the computing power node needs to call a processor of an external computing power node, and the local computing power is called by other computing power nodes at the same time.

It should be understood that the server can determine whether to call each computing power node to participate a computing task corresponding to the computing power service demand according to the computing power calling mode of each computing power node within the time period corresponding to the computing power service demand. Within the time period corresponding to the computing power service demand, the computing power nodes in the open mode can be called.

Afterwards, the server, after comprehensively considering the computing power evaluation value of each computing power node, performs scheme configuration for the computing power service demand to obtain the computing power configuration scheme corresponding to the computing power service demand. The computing power configuration scheme is configured to indicate a computing power demand node and a corresponding computing power service node, a corresponding network path, and computing power tasks to be completed.

Step 140. Power operation instructions are respectively sent to the computing power demand node and the computer power service node indicated in the computing power configuration scheme to make the computing power demand node and the computing power service node establish a computing power calling connection, thus completing the computing power service demand.

Specifically, the server, on the basis of obtaining the computing power configuration scheme, sends the computing power operation instruction to the computing power demand node and the computing power service node according to the computing power configuration scheme, and the computing power node responds to the instruction of the computing power server and confirms the computing power configuration scheme, and the computing power server receives confirmation information.

The computing power demand node receives and confirms the adoption of the computing power configuration scheme. The computing power demand node establishes a computing power calling network connection with the computing power service node that confirms a request, and sends out equation calling and data. The computing power service node returns computed data to the computing power demand node through the network connection or transmits the computed data to the next computing power service node until the whole computing power process is completed.

Compared with the prior art that the computing power optimization of a large-scale computing power network is difficult to achieve due to the fact that the structure and protocol take network routing data transmission speed as the target without considering the algorithm and computing power level, the overall information of the computing power network is adopted in the computing power network node evaluation and operation method to achieve computing power evaluation of each computing power node in a network structure, compute a configuration scheme of computing power service of the computing power network, and manage and supervise the transaction and completion of the computing power service, thus achieving dynamic, real-time and efficient computing power configuration and operation.

In addition, within the time period corresponding to the computing power service demand, computing power of the computing power nodes in the open mode are connected to the grid for service, and the computing power server gives full play to powerful computing power advantages of quantum computing to optimize the configuration and control of the computing power network system. The utilization rate of a processor, a memory, a network router and other computing power network resources of the Internet is significantly improved.

The computing power nodes are connected to the grid in an open mode, and thus more different types of computing power service on the computing power network can be called, with the practical effect that the processor type and capacity of each computing power node are expanded. Each computing power node can be expanded to form collaborative computing power, and the application program is independent of a hardware processor, and codes do not need to be modified and compiled again when the computing power is called by different computing power nodes, and thus the overall collaborative computing efficiency is greatly enhanced.

Based on above embodiments, Step 120 specifically includes the following steps:

Step 121. First candidate computing power nodes satisfying the computing power service demand are determined based on the overall computing power information and a computing power service demand sent by the computing power demand node.

Step 122. A computing power network matrix for the computing power service demand is generated based on a historic computing power service volume between the computing power demand node and each first candidate computing power node as well as a connection relationship between the computing power demand node and each first candidate computing power node, where the historic computing power service volume is determined based on the overall computing power information.

Step 123. The computing power network matrix is solved to obtain a computing power evaluation value of each first candidate computing power node.

Specifically, the server, after receiving the computing power service demand sent by the computing power demand node, can determine the first candidate computing power nodes satisfying the computing power service demand according to the collected overall computing power information. The first candidate computing power nodes here refer to nodes capable of providing computing power service for the computing power demand node, i.e., the nodes with computing power service capable of being called by the computing power demand node.

In a computing power network, there are two necessary conditions for a computing power node A to provide computing power service for a computing power node B: (1) computing power service feature parameters of a service provider A are matched with a service demander B; and (2)

there is a network connection capable of achieving computing power calling between the service provider A and the service provider B. All the first candidate computing power nodes that satisfy these two necessary conditions in the computing power network form a computing power service subnetwork, and then generate the computing power network matrix of the first candidate computing power nodes for the computing power service demand.

Computing power evaluation is to quantitatively compute the relative importance of each computing power node for a given computing power service demand. In this computing power service subnetwork, the simplest algorithm is to divide the probability of interaction equally of any computing node among its possible clients. The more computing power nodes a computing power node i can call, the smaller the probability that the computing power node i calls the computing power service of a certain callable computing power node at specific time. At any time, the computing power node i may choose to call the own computing power, or choose to call the computing power of other computing power nodes, the longer the calling time t, the greater the acquired computing power service volume. Therefore, a probability expected value of the computing power service volume $$S_i'$$

acquired by the computing power node i is computed through the following formula:

$$S_i' = (1 - d_i)t + d_i \sum\nolimits_{j=1, j \neq i}^{n} \frac{S_j}{c_j}$$

in the formula, $$S_i'$$

is an expected value of the computing power service volume acquired by an i-th computing power node, $d_i$ is the probability that the i-th computing power node calls other computing power nodes, t is the duration of computing power calling, $S_j$ is computing power service volume provided to the outside by a j-th first candidate computing power node, and $c_j$ is the number of nodes with a computing power calling relationship with the j-th computing power node.

Similarly, the probability expected value of the computing power service volume $S_i$ provided by the computing power node i is computed through the following formula:

$$S_i = (1 - d_i)t + d_i \sum\nolimits_{j=1, j \neq i}^{n} \frac{S_j}{c_j'}$$

in the formula, $S_i$ is an expected value of the computing power service volume acquired provided by the i-th node, $d_i$ is the probability that the i-th computing power node is called by other computing power nodes, t is the duration of computing power calling, $$S_j'$$

is an expected value of the computing power service volume acquired by the j-th computing power node, and $$c_j'$$

is the number of nodes called by the j-th computing power node.

The computing power service volume per unit time is the computing power value volume, and the probability expected value $$v_i'$$

of the computing power value volume obtained by the computing power node i is computed by the following formula:

$$v_i' = (1 - d_i) + d_i \sum\nolimits_{j=1, j \neq i}^{n} \frac{v_j}{c_j}$$

in the formula, $$v_i'$$

is the computing power value volume acquired by the i-th computing power node, and $v_j$ is the computing power value volume provided by the j-th computing power node.

Similarly, the probability expected value $v_j$ of the computing power value volume provided by the computing power node is computed through the following formula:

$$v_i = (1 - d_i)t + d_i \sum\nolimits_{j=1, j \neq i}^{n} \frac{v_j'}{c_j'}$$

$v_i$ is the computing power value volume provided by the i-th computing power node, and $$v_j'$$

is the computing power value volume acquired by the j-th computing power node.

For a particular computing power network matrix, the computing power value volume of each first candidate computing power node, i.e., a computing power evaluation value, can be iteratively computed through above algorithms. The computing power evaluation value of each first candidate computing power node will be converged as a stable value in finite iterations, and a vector formed by all the first candidate computing power nodes is a feature vector of the computing power network structure matrix connected to the computing power demand node for the computing power service demand.

It should be noted that on the basis of satisfying the computing power service demand, the higher the computing power evaluation value $v_i$ of the first candidate computing power node, the higher the relative importance thereof, and the higher the network security level. For the computing power service calling a high-value computing power node, the computing power server performs judgment according to network security rules. For example, for the computing power service such as deciphering, nuclear reaction simulation and biochemical simulation computation, if the security level of a computing power node is not enough, the computing power server will prevent the computing node for calling the computing power of important high-value computing power nodes.

The computing power evaluation value of each node can be updated periodically, such as once an hour, or updated in time as needed, which is not specifically limited by the embodiment of the present disclosure.

According to the method provided by the embodiment of the present disclosure, the first candidate computing power nodes satisfying the computing power service demand are determined first, then a computing power network matrix for the computing power service demand is generated; and the computing power network matrix is solved to obtain a computing power evaluation value of each first candidate computing power node. The obtained computing power evaluation value obtained therefrom provides a data basis for computing power configuration of the server, thus achieving dynamic and efficient computing power configuration and operation.

In addition, for the computing service demands involving security levels such as deciphering algorithms, the computing power server can further verify, audit and block computing power nodes through the computing power evaluation value on the basis of satisfying the computing power service demand. This security mechanism can prevent network attacks that threaten public and social security from the computing power level.

Based on any above embodiment, Step 121 specifically includes the following steps:

Step 121-1. A computing power service feature parameter demand and algorithm information corresponding to the computing power service demand are determined.

Step 122-1. First candidate computing power nodes conforming to the computing power service feature parameter demand and algorithm information are determined from a computing power service quantitative feature library, where the computing power service quantitative feature library is determined based on the overall computing power information.

Specifically, the first candidate computing power nodes satisfying the computing power service demand may be determined based on the following steps:

First, the computing power service feature parameter demand and algorithm information corresponding to the computing power service demand are determined are determined according to the computing power service demand.

Then, the first candidate computing power nodes conforming to the computing power service feature parameter demand and the algorithm information are determined by searching from the computing power service quantitative feature library.

In one embodiment, the computing power service quantitative feature library is determined based on the following steps:

Step 210. Computing power service feature parameters are generated based on the overall computing power information.

Step 220. A quantitative feature served by each computing power service node is extracted from the computing power service feature parameters, so as to obtain each computing power service quantitative feature.

Step 230. The computing power service quantitative feature library is determined according to each computing power service quantitative feature.

Specifically, the computing power server generates computing power service feature parameters from the collected overall computing power information, extracts the quantitative feature served by each computing power service node from the computing power service feature parameters, and generates the computing power service quantitative feature library from the computing power service quantitative features.

One computing power quantitative feature includes a vector composed of a set of computing power feature dimensions. For example, the computing power feature dimensions include: an algorithm type, a data type, computing speed, an input data volume, an output data volume, network connection speed, a computing error rate, start time, end time, a charge price, a purchase price, a transaction mode, etc.

Any two computing power nodes form a computing power relationship, and each computing power relationship corresponds to multiple possible computing power service quantitative features. All computing power service quantitative features form the computing power service quantitative feature library.

The computing power server, as a root node of the computing power network, periodically collects and updates the computing power quantitative feature library, establishes a computing power service feature value for the collected node computing power information of each computing power node, and simulates the computing power quantitative feature for the computing power nodes with incomplete information or information unable to collect by machine learning. The collected computing power service quantitative feature has higher reliability and update priority than the simulated computing power service quantitative feature.

According to the method provided by the embodiments of the present disclosure, the overall computing power information is converted into the computing power service feature parameters, so as to construct the computing power service quantitative feature library accordingly. The computing power service feature demand and algorithm information corresponding to the computing power service demand sent by any computing power demand node are analyzed, which are matched with the constructed computing power service quantitative feature library, so as to achieve more accurate and reliable dynamic computing power configuration and operation.

In addition, by analyzing the computing power service feature parameters, the computing power server can supervise the computing power configuration and operation in the whole network. For the computing power service demands involving security levels such as deciphering algorithms, the computing power server can further verify, audit and block computing power nodes based on the computing power service quantitative feature library. This security mechanism can prevent network attacks that threaten public and social security from the computing power level.

Based on any above embodiment, Step 130 specifically includes the following steps:

Step 131. A second candidate computing power node is determined from the first candidate computing power nodes, where the second candidate computing power node is a computing power node in which the computing calling mode within the time period corresponding to the computing power service demand is an open mode.

Step 132. An optimal computing power path is determined from the second candidate computing power node with at least one of the highest sum of computing power evaluation values of the computing power nodes in a computing power path, the lowest sum of the computing power prices of the computing power nodes in the computing power path, and the highest ratio of the sum of the computing power evaluation values to the sum of computing power prices of the computing power nodes in the computing power path as a target, and a computing power configuration scheme corresponding to the computing power service demand is determined based on the optimal computing power path.

The computing power price is determined based on the computing power node information.

Specifically, on the basis of obtaining the first candidate computing power nodes, the computing power node in which the computing calling mode within the time period corresponding to the computing power service demand is an open mode can be determined as the second candidate computing power node from the first candidate computing power nodes.

It may be understood that the second candidate computing power node is a node capable of being called by the computing power demand node within the time period for completing the computing power service demand.

Then, the computing power server intelligently searches and chooses an optimal computing power configuration scheme and program according to the computing power service demand.

During the computing power configuration, a computing power measurement standard is relative cost required to complete a computing task corresponding to the computing power service demand. The computing power measurement standard includes a computing power value measurement standard, and a computing power price measurement standard.

The computing power value measurement standard refers to the sum of computing power value volumes of a computing power node called from an initial computing power node to an end computing power node and a router, and the computing power value volume here is the computing power evaluation value.

The computing power price measurement standard refers to the sum of the computing power price spent from an initial computing power node to an end computing power node and transmission data cost. The computing power price here can be obtained according to the computing power node information in the overall computing power information.

Assuming that the number of computing power nodes used for completing the computing power service demand is n, there are multiple computing power paths for completing the computing power task, and the computing power server is configured to compute an optimal computing power path. When computing the optimal computing power path, the computing power server may employ a highest-value path strategy, a lowest-cost path strategy, or an open valuable path first (OVPF) protocol, for example, the OVPF protocol selects a path with high value measurement value and low price measurement standard value.

In addition, the highest-value path strategy takes the highest sum of computing power evaluation values of the computing power nodes in the computing power path as a target; the lowest-cost path strategy takes the lowest sum of computing power prices of the computing power nodes in the computing power path as a target, and the open valuable path takes the highest ratio of the sum of the computing power evaluation values of the computing power nodes to the sum of the computing power prices in the computing power path as a target.

It should be noted that the OVPE is different from an open shortest path first (OSPF) protocol in the prior art, which is an interior gateway protocol, configured to exchange routing information in large or extra-large Internet, can support hundreds of routers at most and is not suitable for large-scale network routing. The OVPF protocol in this embodiment employs a quantum computing power server to achieve an operation configuration of a billion-level large-scale computing power network.

The computing power path can be obtained by algorithm computing, and the computing power configuration scheme corresponding to the computing power service demand can be determined based on the computing power path.

Preferably, in one embodiment, the selection of the optimal computing power path of the computing power network employs a mode of combining Dijkstra algorithm and Floyd algorithm. A connection weight between the nodes of the computing power networks is used for identifying computing power efficiency, the shorter the connection path, the higher the computing power calling efficiency (e.g., computing power cost performance). The Dijkstra algorithm is a single-source shortest path algorithm. Starting from a vertex, the Dijkstra algorithm can only find the shortest distance between the vertex and other points, but not any two points. The Floyd algorithm may be used to solve the shortest path between any two points in a graph, and allows the existence of negative weight edges in the graph. The Floyd algorithm is an algorithm for finding the shortest path between multi-source points in a given weighted graph (both directed graph and undirected graph) by means of dynamic planning idea, that is, the shortest distance of the current distance between two points and the distance after introducing intermediate nodes is taken as the shortest distance between the two points. The Floyd algorithm can be used to calculate the shortest path between any two vertices in the graph, and the time complexity is $O(n^3)$, while the time complexity of single-source point shortest path Dijkstra algorithm is $O(n^2)$. For the large-scale complex network, the Floyd algorithm and Dijkstra algorithm are relatively long in computing time for path planning, and the structure and parameters of the computing power network will change dynamically during the period, leading to untimely and inaccurate path planning results. During implementation, it can be ensured that the computing time of path planning is much less than the computing power calling time by using a quantum computing power server or a supercomputer.

Based on any above embodiment, after Step 140, the method further includes the following steps:

Step 141. The computing power demand node is supervised to pay computing power fee to the computing power service node, and computing power state update information returned by the computing power demand node is received.

Step 142. The overall computing power information is updated based on the computing power state update information.

Specifically, after completing each computing power calling, the computing power demand node pays computing power fee to the computing power service node, and sends computing power information state update information to the computing power server.

The computing power server is configured to evaluate the computing power process, and supervise the process of payment from the computing power demand node to the computing power service node. The computing power server updates the overall computing power information based on the computing power state update information.

Based on any above embodiment, the computing power calling mode of each computing power node is determined by determining whether the computing power service is surplus or not by any computing power node for any computing power service demand of the node.

In a case that the computing power service is surplus, any computing power node determines that the computing power calling mode is an open mode; and in a case that the computing power service is not surplus, the computing power calling mode is the self-sufficient mode.

Specifically, the computing power calling mode is divided into two types, the first type is the self-sufficient mode, that is, the computing power node calls a local processor and memory for computing processing; and the second type is an open mode, that is, the computing power node calls a processor of an external computing power node, and the local computing power is called by other computing power nodes.

For any computing power node, in a specific problem solving task, i.e., any computing power service demand for the node, the task is decomposed into a computing service process consisting of information processing computing equation (Function) in a computing program, i.e., a relational model of equation and data calling. For each computing power service demand consisting of the computing equation and computing data, the computing power node is determined as follows:

Computing power outlet price $P_o$×task duration $t_o$×output probability $r_o$×>computing power inlet price $P_i$×task duration $t_i$×inlet probability $r_i$ where the computing power outlet price $P_o$, the task duration $t_o$, the computing power inlet price $P_i$ and the task duration $t_i$ can be determined through the computing power node information in the overall computing power information, the outlet probability $r_o$ and the inlet probability $r_i$ are counted by the computing power server based on the computing power operation.

For any computing power service demand, if the computing power node after computing satisfies the above formula, it is determined that the computing power service is surplus, and the computing power calling mode is selected as the open mode. If the computing power node after computing does not satisfy the above formula, it is determined that there is no surplus in the computing power service, and the computing power calling mode is selected as the self-sufficient mode. Meanwhile, each computing power node communicates with the server, such that the server can obtain the computing power calling mode of each computing power node in time.

According to the method provided by the embodiments of the present disclosure, each computing power node determines whether the computing power service is surplus or not through computation. In the case that the computing power service is surplus, the computing power service mode is selected as to open mode to avoid wasting computing resources.

In addition, the computing power nodes are connected to the grid in an open mode, and thus more different types of computing power service on the computing power network can be called, with the practical effect that the processor type and capacity of each computing power node are expanded. Each computing power node can be expanded to form collaborative computing power, and the application program is independent of a hardware processor, and codes do not need to be modified and compiled again when the computing power is called by different computing power nodes, and thus the overall collaborative computing efficiency is greatly enhanced.

Based on any above embodiment, FIG. 2 is a schematic diagram of a computing power network according to an embodiment of the present disclosure. As shown in FIG. 2, the computing power network includes a computing power server 200, and N computing power nodes. Data transmission between the computing power sever 200 and each computing power node is achieved.

FIG. 3 is a second flow chart of a computing power network node evaluation and operation method according to an embodiment of the present disclosure. As shown in FIG. 3, the method includes the following steps:

Step 310. The computing power server collects and updates overall computing power information of the computing power network periodically.

The overall computing power information includes computing power node information of computing power nodes, and a connection relationship between the computing power nodes.

Step 320. The computing power service is evaluated based on the overall computing power information to obtain a computing power evaluation value of each computing power node.

Step 330. The computing power node is configured to determine the computing power service demand composed of computing equation and computing data.

Whether the computing power service is surplus or not is determined. In a case that the computing power service is surplus, any computing power node determines that the computing power calling mode is an open mode; and in a case that the computing power service is not surplus, the computing power calling mode is the self-sufficient mode.

Step 340. The computing power server performs intelligent search according to the computing power service demand, so as to choose an optimal computing power configuration scheme and program.

An optimal computing power path is determined from the second candidate computing power node with at least one of the highest sum of computing power evaluation values of the computing power nodes in a computing power path, the lowest sum of the computing power prices of the computing power nodes in the computing power path, and the highest ratio of the sum of the computing power evaluation values to the sum of computing power prices of the computing power nodes in the computing power path as a target, and a computing power configuration scheme corresponding to the computing power service demand is determined based on the optimal computing power path.

Step 350. The computing power demand node receives and confirms to employ the computing power configuration scheme to complete the computing process, and updates the computing power network information.

Referring to FIG. 2, according to the computing power configuration scheme, the computing power demand node 201 establishes a computing power calling network connection 203 with the computing power service node 202 that confirms a request, and sends out equation calling and data. The computing power service node 202 returns computed data to the computing power demand node 201 through the network connection 204 or transmits the computed data to the next computing power service node 205 until the whole computing power process is completed.

Alternatively, further description and explanation of Steps 310-350 can refer to the description and explanation of the above embodiments, and the same technical effect can be achieved. In order to avoid repetition, the further description and explanation will not be described in detail here.

Hereinafter, a computing power network node evaluation and operation apparatus provided by the present disclosure will be described, and the computing power network node evaluation and operation apparatus described below and the computing power network node evaluation and operation method described above can refer to each other correspondingly.

FIG. 4 is a structural diagram of a computing power network node evaluation and operation apparatus according to the present disclosure. As shown in FIG. 4, the apparatus includes:

a computing power information determining unit 410, configured to determine overall computing power information of a computing power network, where the overall computing power information includes computing power node information of computing power nodes, and a connection relationship between the computing power nodes;

a computing power service evaluation unit 420, configured to evaluate computing power service of each computing power node for a computing power service demand based on the overall computing power information and the computing power service demand sent by the computing power demand node to obtain a computing power evaluation value of each computing power node;

a configuration scheme determining unit 430, configured to determine a computing power configuration scheme corresponding to the computing power service demand based on the computing power evaluation value of each computing power node and a computing power calling mode of each computing power node within a time period corresponding to the computing power service demand, where the computing power calling mode is a self-sufficient mode or an open mode; and an operation instruction sending unit 440, configured to respectively send computing power operation instructions to a computing power demand node and a computer power service node indicated in the computing power configuration scheme to make the computing power demand node and the computing power service node establish a computing power calling connection, thus completing the computing power service demand.

According to the computing power network node evaluation and operation method and apparatus, the overall information of the computing power network is adopted to achieve computing power evaluation of each computing power node in a network structure, compute a configuration scheme of computing power service of the computing power network, and manage and supervise the transaction and completion of the computing power service, thus achieving dynamic, real-time and efficient computing power configuration and operation.

In addition, within the time period corresponding to the computing power service demand, computing power of the computing power nodes in the open mode are connected to the grid for service, and the computing power server gives full play to powerful computing power advantages of quantum computing to optimize the configuration and control of the computing power network system. The utilization rate of a processor, a memory, a network router and other computing power network resources of the Internet is significantly improved.

The computing power nodes are connected to the grid in an open mode, and thus more different types of computing power service on the computing power network can be called, with the practical effect that the processor type and capacity of each computing power node are expanded. Each computing power node can be expanded to form collaborative computing power, and the application program is independent of a hardware processor, and codes do not need to be modified and compiled again when the computing power is called by different computing power nodes, and thus the overall collaborative computing efficiency is greatly enhanced.

Based on any above embodiment, the computing power service evaluation unit 420 is further configured to:

determine first candidate computing power nodes satisfying the computing power service demand based on the overall computing power information of the computing power network and the computing power service demand sent by the computing power demand node;

generate a computing power network matrix for the computing power service demand based on a historic computing power service volume between the computing power demand node and each first candidate computing power node as well as a connection relationship between the computing power demand node and each first candidate computing power node, where the historic computing power service volume is determined based on the overall computing power information; and solve the computing power network matrix to obtain a computing power evaluation value of each first candidate computing power node.

Based on any above embodiment, the computing power service evaluation unit 420 is further configured to:

determine a computing power service feature parameter demand and algorithm information corresponding to the computing power service demand; and determine first candidate computing power nodes conforming to the computing power service feature parameter demand and algorithm information from a computing power service quantitative feature library, where the computing power service quantitative feature library is determined based on the overall computing power information.

Based on any above embodiment, the computing power network node evaluation and operation apparatus further includes a feature library determining unit, which is configured to:

generate computing power service feature parameters based on the overall computing power information;

extract a quantitative feature served by each computing power service node from the computing power service feature parameters, so as to obtain each computing power service quantitative feature; and determine the computing power service quantitative feature library according to each computing power service quantitative feature.

Based on any above embodiment, the configuration scheme determining unit 440 is further configured to:

determine a second candidate computing power node from the first candidate computing power nodes, where the second candidate computing power node is a computing power node in which the computing calling mode within the time period corresponding to the computing power service demand is an open mode;

determine an optimal computing power path from the second candidate computing power node with at least one of the highest sum of computing power evaluation values of the computing power nodes in a computing power path, the lowest sum of the computing power prices of the computing power nodes in the computing power path, and the highest ratio of the sum of the computing power evaluation values to the sum of computing power prices of the computing power nodes in the computing power path as a target, and determine a computing power configuration scheme corresponding to the computing power service demand based on the optimal computing power path.

The computing power price is determined based on the computing power node information.

Based on any above embodiment, the computing power network node evaluation and operation apparatus further includes an information updating unit, which is configured to:

supervise the computing power demand node to pay computing power fee to the computing power service node, and receive computing power state update information returned by the computing power demand node; and update the overall computing power information based on the computing power state update information.

Based on any above embodiment, the computing power calling mode of each computing power node is determined by determining whether the computing power service is surplus or not by any computing power node for any computing power service demand of the node. In a case that the computing power service is surplus, any computing power node determines that the computing power calling mode is an open mode; and in a case that the computing power service is not surplus, the computing power calling mode is the self-sufficient mode.

Figure 5:
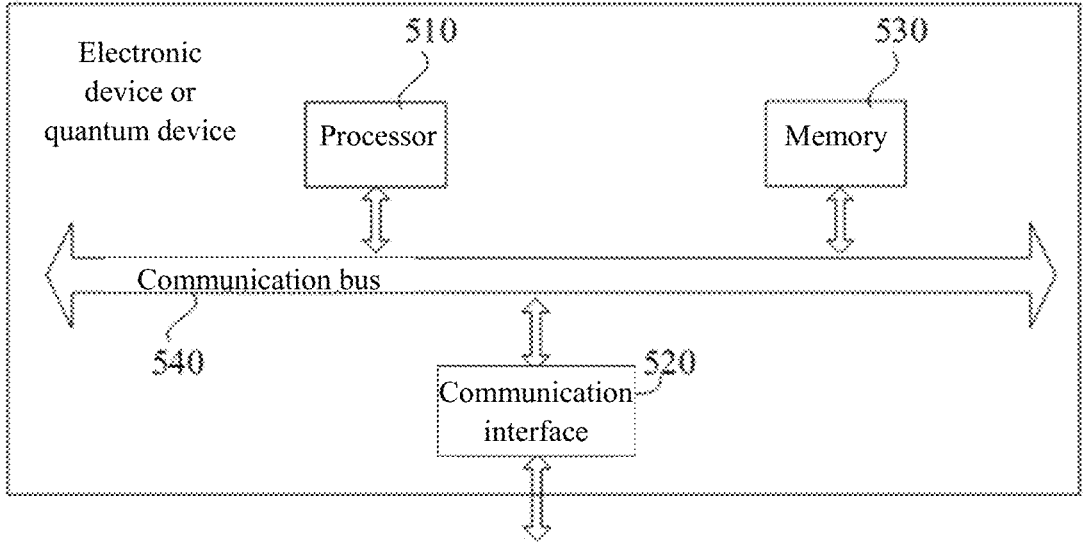
FIG. 5 is a structural diagram of an electronic device according to the present disclosure.

FIG. 5 illustrates a schematic diagram of an entity structure of an electronic device or a quantum device. As shown in FIG. 5, the electronic device or quantum device may include: a processor 510, a communication interface 520, a memory 530, and a communication bus 550. The processor 510, the communication interface 520 and the memory 530 communicate with one another through the communication bus 550. The processor 510 may call a logic instruction in the memory 530 to execute the computing power network node evaluation and operation method. The method includes the following steps: determining overall computing power information of a computing power network, where the overall computing information includes computing power node information of computing power nodes and a connection relationship between the computing power nodes; evaluating computing power service of each computing power node for a computing power service demand based on the overall computing power information of the computing power network and a computing power service demand sent by a computing power demand node to obtain a computing power evaluation value of each computing power node; determining a computing power configuration scheme corresponding to the computing power service demand based on the computing power evaluation value of each computing power node and a computing power calling mode of each computing power node within a time period corresponding to the computing power service demand, where the computing power calling mode is a self-sufficient mode or an open mode; and respectively sending computing power operation instruc-
tions to a computing power demand node and a com-
puter power service node indicated in the computing
power configuration scheme to make the computing
power demand node and the computing power service
node establish a computing power calling connection,
thus completing the computing power service demand.

In addition, the logic instruction in the memory 530 may
be implemented in the form of software functional units, and
may be stored in a computer-readable storage medium when
being sold or used as an independent product. Based on such
an understanding, the essence of the technical solution, or
the part contributing to the prior art may be implemented in
the form of a software product. The computer software
product is stored in a storage medium, and includes several
instructions for indicating a computer device (which may be
a personal computer, a server, or a network device) to
execute all or some of the steps of the method described in
the embodiments of the present disclosure. The above-
mentioned storage media include: a U disk, a mobile hard
disk, a read-only memory (ROM), a random access memory
(RAM), a magnetic disk or an optical disk, and other media
capable of storing program codes.

In another aspect, a computer program product is further
provided by the present disclosure. The computer program
product includes an electronic computer program and/or a
quantum computer program. The computer program can be
stored on a non-transient computer readable storage
medium. The computer program, when executed by the
processor, can execute the computing power network node
evaluation and operation method. The method includes the
following steps: determining overall computing power
information of a computing power network, where the
overall computing information includes computing power
node information of computing power nodes and a connec-
tion relationship between the computing power nodes;
evaluating computing power service of each computing
power node for a computing power service demand based on
the overall computing power information of the computing
power network and a computing power service demand sent
by a computing power demand node to obtain a computing
power evaluation value of each computing power node;
determining a computing power configuration scheme cor-
responding to the computing power service demand based
on the computing power evaluation value of each computing
power node and a computing power calling mode of each
computing power node within a time period corresponding
to the computing power service demand, where the com-
puting power calling mode is a self-sufficient mode or an
open mode; and respectively sending computing power
operation instructions to a computing power demand node
and a computer power service node indicated in the com-
puting power configuration scheme to make the computing
power demand node and the computing power service node
establish a computing power calling connection, thus com-
pleting the computing power service demand.

In still another aspect, a non-transient computer readable
storage medium is further provided by the present disclo-
sure, an electronic computer program and/or a quantum
computer program are/is stored on the non-transient com-
puter readable storage medium. The computer program,
when executed by the processor, is implemented to execute
the computing power network node evaluation and operation
method. The method includes the following steps: determin-
ing overall computing power information of a computing
power network, where the overall computing information
includes computing power node information of computing power nodes and a connection relationship between the
computing power nodes; evaluating computing power ser-
vice of each computing power node for a computing power
service demand based on the overall computing power
information of the computing power network and a com-
puting power service demand sent by a computing power
demand node to obtain a computing power evaluation value
of each computing power node; determining a computing
power configuration scheme corresponding to the comput-
ing power service demand based on the computing power
evaluation value of each computing power node and a
computing power calling mode of each computing power
node within a time period corresponding to the computing
power service demand, where the computing power calling
mode is a self-sufficient mode or an open mode; and
respectively sending computing power operation instruc-
tions to a computing power demand node and a computer
power service node indicated in the computing power con-
figuration scheme to make the computing power demand
node and the computing power service node establish a
computing power calling connection, thus completing the
computing power service demand.

The apparatus embodiments described above are only
schematic, in which the units described as separate compo-
nents may or may not be physically separated, and the
components displayed as modules may or may not be
physical units, that is, they may be located in one place, or
may be distributed to multiple network units. A part or all of
the modules can be selected according to actual needs to
implement the purpose of this embodiment. Those of ordi-
nary skill in the art in this field can understand and imple-
ment it without creative labor.

Through the description of the above embodiments, those
skilled in the art can clearly understand that the various
embodiments may be implemented by software and a nec-
essary universal hardware platform. Of course, the embodi-
ments may also be implemented by hardware. Based on such
an understanding, the essence of the technical solution, or
the part contributing to the prior art may be implemented in
the form of a software product. The computer software
product is stored in a computer readable storage medium,
such as ROM (Read-only memory)/RAM (Random access
memory), a magnetic disk, an optical disk, and includes
several instructions for indicating a computer device (which
may be a personal computer, a server, or a network device)
to execute all or some of the steps of the method described
in the embodiments of the present disclosure.

Finally, it should be noted that the above embodiments are
only used to illustrate the technical solution of the present
disclosure rather than limiting. Although the present disclo-
sure has been described in detail with reference to the
foregoing embodiments, those of ordinary skill in the art
should understand that it is still possible to modify the
technical solution described in the foregoing embodiments,
or to replace some technical features with equivalents.
However, these modifications or substitutions do not make
the essence of the corresponding technical solutions deviate
from the spirit and scope of the technical solutions of various
embodiments of the present disclosure.

What is claimed is:

1. A computing power network node evaluation and
operation method, wherein the method is applied to a
computing power server in a computing power network, the
computing power network comprises at least one computing
power node, and the method comprises the following steps:
determining an overall computing power information of the
computing power network, wherein the overall computing power information comprises a computing power node information of each computing power node, and a connection relationship between each computing power node;

generating computing power service feature parameters based on the overall computing power information, extracting a quantitative feature served by each computing power service node from the computing power service feature parameters, so as to obtain each computing power service quantitative feature, and determining a computing power service quantitative feature library according to each computing power service quantitative feature;

determining a computing power service feature parameter demand and an algorithm information corresponding to a computing power service demand sent by a computing power demand node, and determining first candidate computing power nodes conforming to the computing power service feature parameter demand and the algorithm information from the computing power service quantitative feature library;

generating a computing power network matrix for the computing power service demand based on a historic computing power service volume between the computing power demand node and each of the first candidate computing power nodes as well as a connection relationship between the computing power demand node and each of the first candidate computing power nodes, wherein the historic computing power service volume is determined based on the overall computing power information; solving the computing power network matrix to obtain a computing power evaluation value of each of the first candidate computing power nodes;

determining a computing power configuration scheme corresponding to the computing power service demand based on the computing power evaluation value of each computing power node and a computing power calling mode of each computing power node within a time period corresponding to the computing power service demand, wherein the computing power calling mode is a self-sufficient mode or an open mode; and respectively sending computing power operation instructions to a computing power demand node and a computer power service node indicated in the computing power configuration scheme to make the computing power demand node and the computing power service node establish a computing power calling connection, thus completing the computing power service demand.

2. The computing power network node evaluation and operation method according to claim 1, wherein the determining a computing power configuration scheme corresponding to the computing power service demand based on the computing power evaluation value of each computing power node and a computing power calling mode of each computing power node within a time period corresponding to the computing power service demand comprises the following steps:

determining a second candidate computing power node from the first candidate computing power nodes, wherein the second candidate computing power node is a computing power node in which the computing calling mode within the time period corresponding to the computing power service demand is an open mode;

determining an optimal computing power path from the second candidate computing power node with at least one of the highest sum of computing power evaluation values of the computing power nodes in a computing power path, the lowest sum of computing power prices of the computing power nodes in the computing power path, and the highest ratio of the sum of the computing power evaluation values to the sum of computing power prices of the computing power nodes in the computing power path as a target; and determining a computing power configuration scheme corresponding to the computing power service demand based on the optimal computing power path;

wherein the computing power price is determined based on the computing power node information.

3. The computing power network node evaluation and operation method according to claim 1, wherein after the respectively sending computing power operation instructions to a computing power demand node and a computer power service node indicated in the computing power configuration scheme to make the computing power demand node and the computing power service node establish a computing power calling connection to complete the computing power service demand, the method further comprises the following steps:

supervising the computing power demand node to pay computing power fee to the computing power service node, and receiving computing power state update information returned by the computing power demand node; and updating the overall computing power information based on the computing power state update information.

4. The computing power network node evaluation and operation method according to claim 1, wherein the computing power calling mode of each computing power node is determined by determining whether the computing power service is surplus or not by any computing power node for any computing power service demand of the node;

in a case that the computing power service is surplus, any computing power node determines that the computing power calling mode is an open mode; and in a case that the computing power service is not surplus, the computing power calling mode is the self-sufficient mode.

5. An electronic device or a quantum device, comprising a memory, a processor, and a computer program stored on the memory and capable of being operated on the processor, wherein the processor, when executing the computer program, is able to implement the computing power network node evaluation and operation method according to claim 1.

6. A non-transient computer-readable storage medium, wherein an electronic computer program and/or a quantum computer program are/is stored on the non-transient computer-readable storage medium, and the computer program, when executed by a processor, is able to implement the computing power network node evaluation and operation method according to claim 1.

* * * * *